US006862633B2

(12) United States Patent
Osborne et al.

(10) Patent No.: US 6,862,633 B2
(45) Date of Patent: Mar. 1, 2005

(54) N TO 1 INTELLIGENT MULTIPLEXOR

(75) Inventors: Shelly M. Osborne, Nicholasville, KY (US); Kenneth W. Sallings, New Albany, IN (US)

(73) Assignee: Image Vault LLC

( * ) Notice: Subject to any disclaimer, the term of this patent is extended or adjusted under 35 U.S.C. 154(b) by 77 days.

(21) Appl. No.: 10/179,878

(22) Filed: Jun. 26, 2002

(65) Prior Publication Data

US 2004/0003146 A1 Jan. 1, 2004

(51) Int. Cl.$^7$ ................................................. G06F 3/00
(52) U.S. Cl. ............................. 710/36; 710/18; 710/20; 710/5
(58) Field of Search .............................. 710/51, 7, 12, 710/18, 20, 36, 38, 52, 65, 112; 712/225; 711/208, 209

(56) References Cited

U.S. PATENT DOCUMENTS

| | | | | |
|---|---|---|---|---|
| 4,794,589 A | * | 12/1988 | Finch et al. ................... | 370/60 |
| 5,363,119 A | * | 11/1994 | Snyder et al. ............... | 345/131 |
| 5,675,506 A | * | 10/1997 | Savic ........................... | 364/509 |
| 5,784,487 A | * | 7/1998 | Cooperman .................. | 382/175 |
| 6,038,250 A | * | 3/2000 | Shou et al. .................. | 375/206 |
| 6,049,525 A | * | 4/2000 | Takahashi et al. ........... | 370/223 |

* cited by examiner

*Primary Examiner*—Jeffrey Gaffin
*Assistant Examiner*—Alan S Chen
(74) *Attorney, Agent, or Firm*—H. Jay Spiegel

(57) ABSTRACT

A multiplexor is designed to receive data from a plurality of data sources. As the multiplexor receives data from data sources, its programmable logic device codes each stream of data with a header and a footer and a data stream segment between them having a prescribed number of characters. A message from any particular data source may be coded into a plurality of separate data stream segments. The multiplexor sequences to the next data source when a data stream having the prescribed number of bytes has been captured and returns to that data source only after data streams of the same prescribed number of characters have been captured from the other data sources in a sequential manner. Data so coded is forwarded to a storage device that may store the data on any suitable storage medium for later retrieval.

18 Claims, 3 Drawing Sheets

IVQ4
Multi-Channel POS Application

!0Hello.  My name&!2Image Vault is a&!0
is Ken.&!2 great product&

N TO 1 INTELLIGENT MULTIPLEXOR

BACKGROUND OF THE INVENTION

The present invention relates to an N to 1 intelligent multiplexor. The present invention is designed for serial data transmission to facilitate storage of information from a plurality of data sources such as, for example, cash registers, cash handling safes, automated teller machines, and alarm panels.

Multiplexors are known in the prior art. However, Applicants are unaware of any prior multiplexor that includes the intelligent features of the present invention including creation of data streams from a plurality of data sources that are conveyed to a storage device in a manner facilitating later retrieval.

SUMMARY OF THE INVENTION

The present invention relates to an N to 1 intelligent multiplexor. The present invention includes the following interrelated objects, aspects and features:

(1) In a first aspect, the present invention contemplates a multiplexor designed to receive data from a plurality of data sources such as, for example, cash registers, cash handling safes, automated teller machines, or alarm panels. As one example, a multiplexor in accordance with the teachings of the present invention receives data from four such sources. Of course, the number of data sources may be modified as desired.

(2) As the inventive multiplexor receives data from data sources, the multiplexor's programmable logic device codes each stream of data with a header and a footer and data therebetween having a prescribed number of characters.

(3) A message from any particular data source may be coded into a plurality of separate data streams. The multiplexor sequences to the next data source when a data stream having the prescribed number of bytes has been captured and returns to that data source only after data streams of the same prescribed number of characters have been captured from the other data sources in a sequential manner.

(4) Data so coded is forwarded to a storage device that may store the data on any suitable storage medium for later retrieval.

As such, it is a first object of the present invention to provide an N to 1 intelligent multiplexor.

It is a further object of the present invention to provide such a device in which data streams from data sources are split up into data streams having prescribed lengths.

It is a still further object of the present invention to provide such a device in which the data streams are coded with headers and footers permitting distinguishing of their sources.

It is a still further object of the present invention to provide such a device in which coded data streams are forwarded to a storage device for later retrieval.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
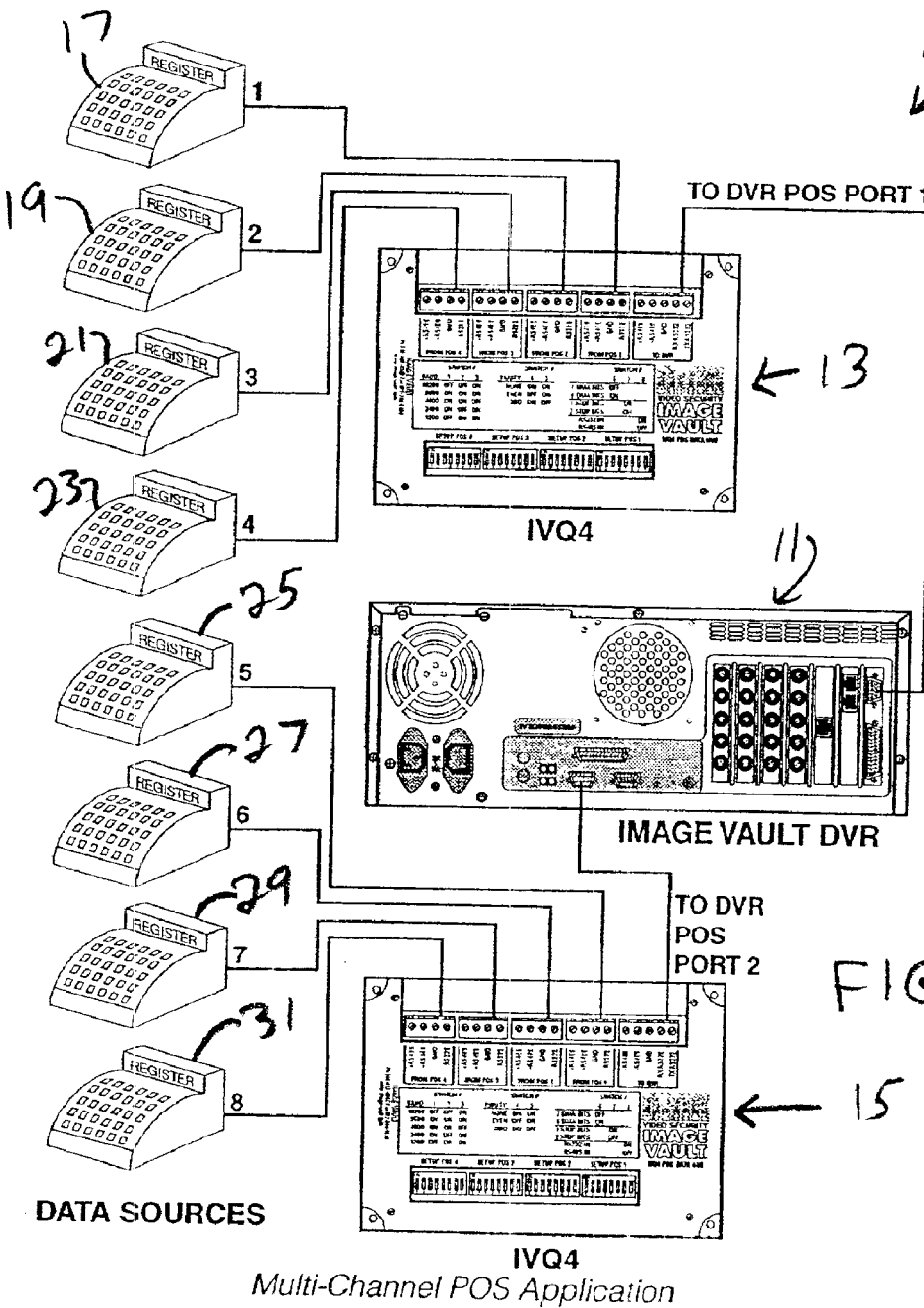
FIG. 1 shows a schematic representation of an electrical circuit incorporating the inventive intelligent multiplexor.

With reference first to FIG. 1, a system incorporating the present invention is generally designated by the reference numeral 10 and is seen to include a storage device 11, for example, a digital video recorder, to which are coupled two multiplexors 13 and 15 in accordance with the teachings of the present invention. The multiplexor 13 has coupled thereto four data sources 17, 19, 21 and 23. The multiplexor 15 has four data sources coupled thereto designated by the reference numerals 25, 27, 29 and 31. The data sources shown in FIG. 1 are cash registers. Of course, the data sources can, if desired, consist of numerous other examples of data sources such as, for example, cash handling safes, automated teller machines, and/or alarm panels.

Figure 2:
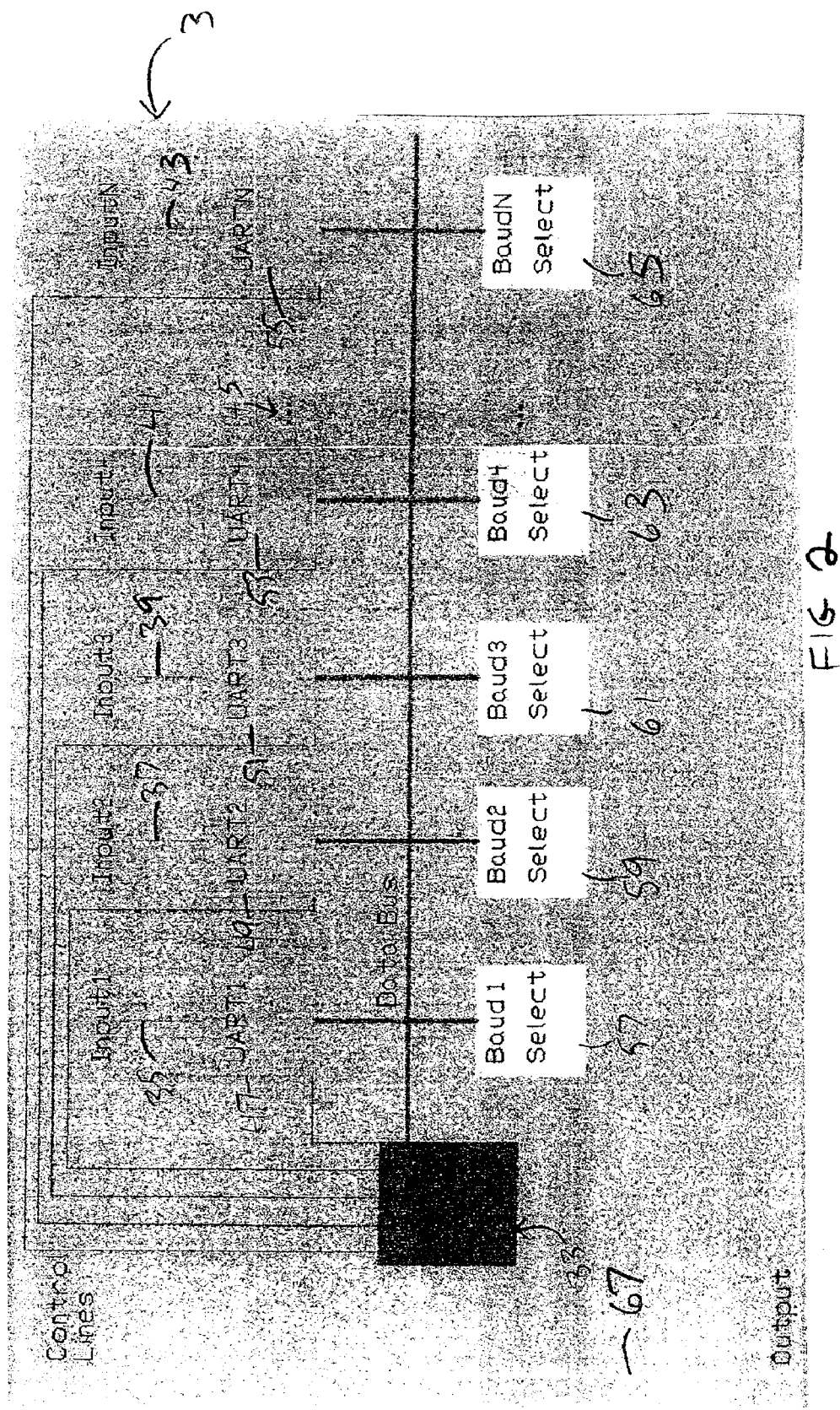
FIG. 2 shows a schematic representation of the electrical circuitry of the inventive intelligent multiplexor.

Reference is now made to FIG. 2 which shows a schematic representation of one of the multiplexors, in this case, the multiplexor 13. As seen, the multiplexor 13 includes a microcomputer 33 and four input conductors 35, 37, 39 and 41. As depicted in FIG. 2, the multiplexor 13 is not limited to four inputs but also shows the input N designated by the reference numeral 43 and three dots designated by the reference numeral 45 and intended to depict the concept that any number of inputs may be provided.

Each input is connected to a universal asynchronous receiver-transmitter (UART device) which are designated in FIG. 2 by the reference numerals 47, 49, 51, 53 and 55, respectively. Each UART device has a configuration controlled by an associated control box. The control boxes are designated by the reference numerals 57, 59, 61, 63 and 65. The control boxes determine which line receiver drives the input to the UARTs and also set the baud rate data bits, parity, stop bits and type of line receiver.

When the system 13 is activated, the microcomputer 33 checks the control boxes and configures the corresponding UART devices. Then, it configures the output 67. Once these tasks are accomplished, the device 13 acts as a multiplexor.

Figures 3, 4:
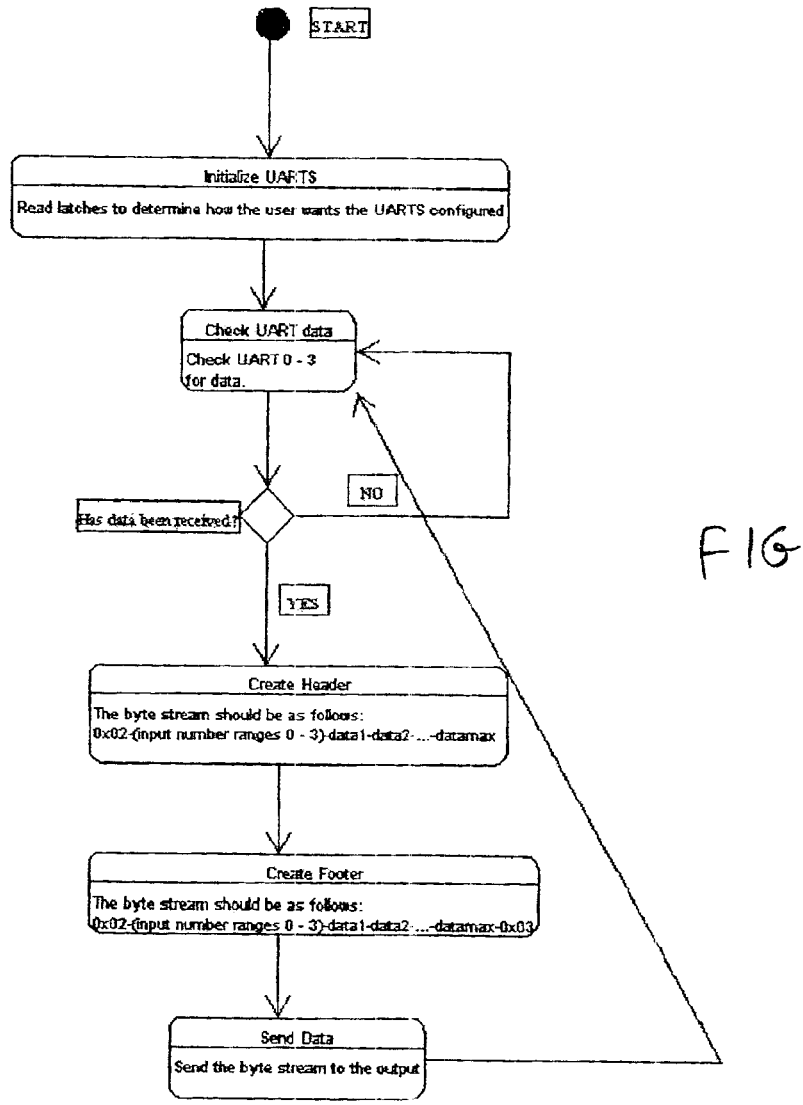
FIG. 3 shows a flowchart of the logic of operation of the inventive intelligent multiplexor.
FIG. 4 shows an example of a stream of output data coded in accordance with the teachings of the present invention.

With reference to FIG. 3, the manner of operation of the inventive device will be better understood. As shown in FIG. 3, upon activation of the device 13, the UART devices are initialized, and determination is made as to how the user wishes each UART device to be configured. The microcomputer 33 checks the UART device data and checks each UART device for data being received. If no data has yet been received, the system is in a state of limbo until such time as data begins to be received. Once data has been received, each string of data is divided up into a plurality of byte streams, each one of which includes a prescribed number of bytes. The system creates a particular header and a particular footer for each portion of a data stream received from each UART device and then sends each such portion to the output 67 of the device 13. This procedure continues on sequentially for each UART device as each sequential portion of a data stream is coded and outputted.

While referring to FIG. 3 and with reference to FIG. 4, the manner of coding of data streams will be described in somewhat greater detail. For example, a data stream from one input is received in one UART device and is split into portions, each of which has a maximum of 16 bytes. At the beginning of the portion, two characters or bytes are attached, the first one being a character (shown as ! in FIG.

4) to let the storage facility know that the beginning of a portion is coming, and then the next character corresponds to the particular input from which the portion arose. Next, a data stream portion having the maximum number of bytes (for example, 16) is provided, followed by a symbol (the & shown in FIG. 4) to signal the end of the portion of the data stream. The very next symbol will be the symbol "!" letting the system know that the beginning of another data stream portion is coming, followed by the number 2 signaling that data is coming from another input, in this case, the input number 3. (Inputs 1–4 are numbered 0–3 respectively.) From this explanation, the present invention should be better understood.

With reference to FIG. 4, input 1, symbolized by the symbol 0 has data "Hello. My name is Ken." The input 3 symbolized by the number 2 has the data "Image Vault is a great product." FIG. 4 shows how, with the explanation made above, the data streams from the inputs 1 and 3 are divided into data stream portions and appropriately coded. As explained above, the inputs 1–4 are given the coding 0–3, respectively.

The present invention may be designed to accept four or more asynchronous inputs, for example, at a maximum baud rate of 19200 baud. The inputs can be standard industry-wide inputs such as, for example, RS232 or RS485. Where the output is RS232, operation can be conducted at up to 115200 baud.

In the example shown in FIG. 4, the ! symbol is used for the beginning of a data stream portion, and the & symbol is used to show the termination of that data stream portion. In accordance with the teachings of the present invention, where those symbols are employed for those purposes, those symbols may not be used for other purposes, for example, within the messages contained within the data stream portions so that the computer can distinguish between a header, a footer, and a data stream.

In the preferred environment of contemplated use, the present invention may be employed to facilitate storage of transaction information from a large retail establishment having a multiplicity of data sources such as cash registers. In the example shown in FIG. 1, a system using two of the intelligent multiplexors can monitor data transactions in 8 cash registers. Of course, if desired, a single such intelligent multiplexor could be used to monitor transactions in as many as 8 or more data sources such as cash registers. The data base contained within the Image Vault DVR 11, shown in FIG. 1, can be cross-referenced and searched and can be used to create audit trail entries.

As such, an invention has been disclosed in terms of a preferred embodiment thereof which fulfills each and every one of the objects of the invention as set forth hereinabove, and provides a new and useful N to 1 intelligent multiplexor of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. A multiplexor, comprising:
   a) a plurality of inputs and a single output;
   b) control means associated with each input for controlling parameters of receiving data from said inputs;
   c) computer means for operating said control means and for receiving data from said inputs;
   d) said computer means receiving said data from each input in the form of a data stream, dividing a data stream from each input into a plurality of segments of prescribed length, coding each segment with a header and a footer, and conveying each coded segment to said output, said header and footer comprising unique symbols not used in said data stream.

2. The multiplexor of claim 1, wherein said computer means includes sequencing means for sequentially conveying a first coded segment from each respective input to said output, whereupon said sequencing means conveys a second coded segment from each respective input to said output, and so on.

3. The multiplexor of claim 1, wherein each input is connected to said computer means via a universal asynchronous receiver-transmitter (UART).

4. The multiplexor of claim 3, wherein said control means is connected to each UART.

5. The multiplexor of claim 4, wherein said control means is adapted to set parameters chosen from the group consisting of baud rate, data bits, parity, stop bits and type of line receiver.

6. The multiplexor of claim 1, wherein said control means is adapted to set parameters chosen from the group consisting of baud rate, data bits, parity, stop bits and type of line receiver.

7. The multiplexor of claim 1, including a separate control means for each input.

8. The multiplexor of claim 1, wherein said plurality of inputs comprises four inputs.

9. The multiplexor of claim 1, wherein said output is connected to a storage device.

10. A multiplexor, comprising:
    a) a plurality of inputs and a single output;
    b) a universal asynchronous receiver-transmitter (UART) connected to each input;
    c) control means connected to each UART for setting parameters chosen from the group consisting of baud rate, data bits, parity, stop bits and type of line receiver;
    d) computer means for operating said control means and for receiving data from said inputs;
    e) said computer means receiving said data from each input in the form of a data stream, dividing a data stream from each input into a plurality of segments of prescribed length, coding each segment with a header and a footer, and conveying each coded segment to said output, said header and footer comprising unique symbols not used in said stream; and
    f) wherein said computer means includes sequencing means for sequentially conveying a first coded segment from each respective input to said output, whereupon said sequencing means conveys a second coded segment from each respective input to said output, and so on.

11. The multiplexor of claim 10, wherein said plurality of inputs comprises four inputs.

12. The multiplexor of claim 10, wherein said output is connected to a storage device.

13. A method of conveying signals from a plurality of data sources to a storage device, including the steps of:
    a) providing a multiplexor including:
       i) a plurality of inputs and a single output;
       ii) control means associated with each input for controlling parameters of receiving data from said inputs;
       iii) computer means for operating said control means and for receiving data from said inputs;

b) connecting each input to a data source;

c) receiving data at said computer means including a data stream from each input;

d) dividing each data stream into segments of prescribed length;

e) coding each segment with a header and footer, said header and footer comprising unique symbols not used in said data stream;

f) conveying each coded segment to said output.

14. The method of claim 13, wherein said conveying step includes the step of sequentially conveying first coded data segments from said inputs followed by sequentially conveying second coded data segments from said inputs.

15. The method of claim 13, wherein each input is connected to said computer means via a universal asynchronous receiver-transmitter (UART).

16. The method of claim 15, further including the step of using said control means to set parameters chosen from the group consisting of baud rate, data bits, parity, stop bits and type of line receiver.

17. The method of claim 15, further including the step of, after said conveying step, transmitting coded segments to a storage device.

18. The method of claim 13, wherein said plurality of inputs comprises four inputs.

* * * * *